United States Patent
Ritter

(10) Patent No.: US 6,520,534 B2
(45) Date of Patent: Feb. 18, 2003

(54) INFLATABLE OCCUPANT PROTECTIVE CUSHION

(75) Inventor: Philipp Ritter, Schwäbisch Gmünd (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/905,520

(22) Filed: Jul. 13, 2001

(65) Prior Publication Data

US 2002/0011720 A1 Jan. 31, 2002

(30) Foreign Application Priority Data

Jul. 17, 2000 (DE) .................................. 200 12 329 U

(51) Int. Cl.[7] .......................... B60R 21/22; B60R 21/06
(52) U.S. Cl. .................................. 280/730.2; 280/743.1
(58) Field of Search ............................ 280/730.2, 749, 280/743.1, 730.1, 729

(56) References Cited

U.S. PATENT DOCUMENTS

| | | | | |
|---|---|---|---|---|
| 5,906,391 A | * | 5/1999 | Weir et al. ................... | 280/729 |
| 5,957,487 A | * | 9/1999 | Stutz ........................ | 280/730.2 |
| 5,957,493 A | * | 9/1999 | Larsen et al. ............. | 280/743.1 |
| 6,059,312 A | * | 5/2000 | Staub et al. ................. | 280/729 |
| 6,176,514 B1 | * | 1/2001 | Einsiedel .................. | 280/730.2 |
| 6,199,898 B1 | * | 3/2001 | Masuda et al. .......... | 280/730.2 |
| 6,276,712 B1 | * | 8/2001 | Welch et al. ............. | 280/730.2 |
| 6,293,581 B1 | * | 9/2001 | Saita et al. ............... | 280/730.2 |

FOREIGN PATENT DOCUMENTS

| | | |
|---|---|---|
| DE | 19823492 | 12/1999 |
| DE | 29914637 | 1/2000 |

* cited by examiner

*Primary Examiner*—Paul N. Dickson
*Assistant Examiner*—Laura B. Rosenberg
(74) *Attorney, Agent, or Firm*—Tarolli, Sundheim, Covell, Tummino & Szabo L.L.P.

(57) ABSTRACT

An inflatable occupant protective cushion for use along an upper side area in vehicles between an A-column and an C-column, comprising at least two inflatable chambers connected to each other and spaced from each other in a lengthwise direction of the vehicle. The chambers include a front chamber that extends, when inflated, next to typical sitting positions of front occupants and a rear chamber that extends, when inflated, next to typical sitting positions of rear occupants, wherein the front and rear chambers have front and rear delineation lines that are curved in a manner to correspond to a perpendicular projection of the typical sitting positions onto the inflated cushion.

8 Claims, 1 Drawing Sheet

INFLATABLE OCCUPANT PROTECTIVE CUSHION

FIELD OF THE INVENTION

The invention relates to an inflatable occupant protective cushion for use along an upper side area in vehicles between a A-column and a C-column, comprising at least two inflatable chambers connected to each other and spaced from each other in a lengthwise direction of the vehicle, said chambers including a front chamber that extends, when inflated, next to typical sitting positions of front occupants and a rear chamber that extends, when inflated, next to typical sitting positions of rear occupants.

BACKGROUND OF THE INVENTION

In the unfolded state, such an occupant protective cushion can extend over a partial area or over the entire area of the side windows, thus providing protection in case of a side impact.

In order to ensure the best possible protection for the occupants in case of a collision, the size of the chambers of the occupant protective cushion has to be dimensioned in such a way that a sufficiently large chamber volume is available to absorb the energy, taking into account the different body sizes and sitting positions of the occupants. According to the state of the art, the horizontal delineation of the chambers of the occupant protective cushions runs along the lower roof edge or upper window edge of the vehicle, whereas the vertical chamber delineation runs approximately parallel to the lengthwise axis of the occupants in their various sitting positions. The resulting chamber shape is essentially a parallelogram. The inside wall and the outside wall of the occupant protective cushion are joined to each other by means of seams.

BRIEF DESCRIPTION OF THE INVENTION

The present invention provides an occupant protective cushion with chambers that provide the best possible protection for all kinds of body sizes and sitting positions of the occupants in case of side collisions.

This is achieved by an occupant protective cushion of the type described above having at least two inflatable chambers connected to each other, the front and rear chambers having front and rear delineation lines that are curved in a manner to correspond to a perpendicular projection of the typical sitting positions onto the inflated cushion. This means that the chambers have an essentially circular or elliptical contour on said projection plane. Consequently, the occupant protective cushion can be designed in such a way that the front and rear delineation lines of the chambers are oriented primarily according to the sitting positions and body sizes of the occupants in order to ensure the best possible protection of the occupants. Another advantage of the invention lies in the fact that, when two textile layers that lie on top of each other and that are joined along a circumferential edge and joined to each other by means of a plurality of spacers inside the circumferential edge, there are no larger continuous areas in the chambers in which the penetration resistance is diminished. Since the inner and outer textile layers are only directly joined to each other at the edge, but not in the surface area of the protective cushion that is effective for the protection of the occupants, the protective effect of the occupant protective cushion is fully retained, even in the extreme case of penetration by a vertical object. The occupant protective cushion can support and restrain the occupants over its entire surface area that is effective for the protection of the occupants.

Advantageous embodiments of the invention ensue from the additional subordinate claims.

BRIEF DESCRIPTION OF THE DRAWINGS

The invention will be described below the reference to a preferred embodiment that is shown in the appended drawing in which.

DETAILED DESCRIPTION OF THE INVENTION

Figure 1:
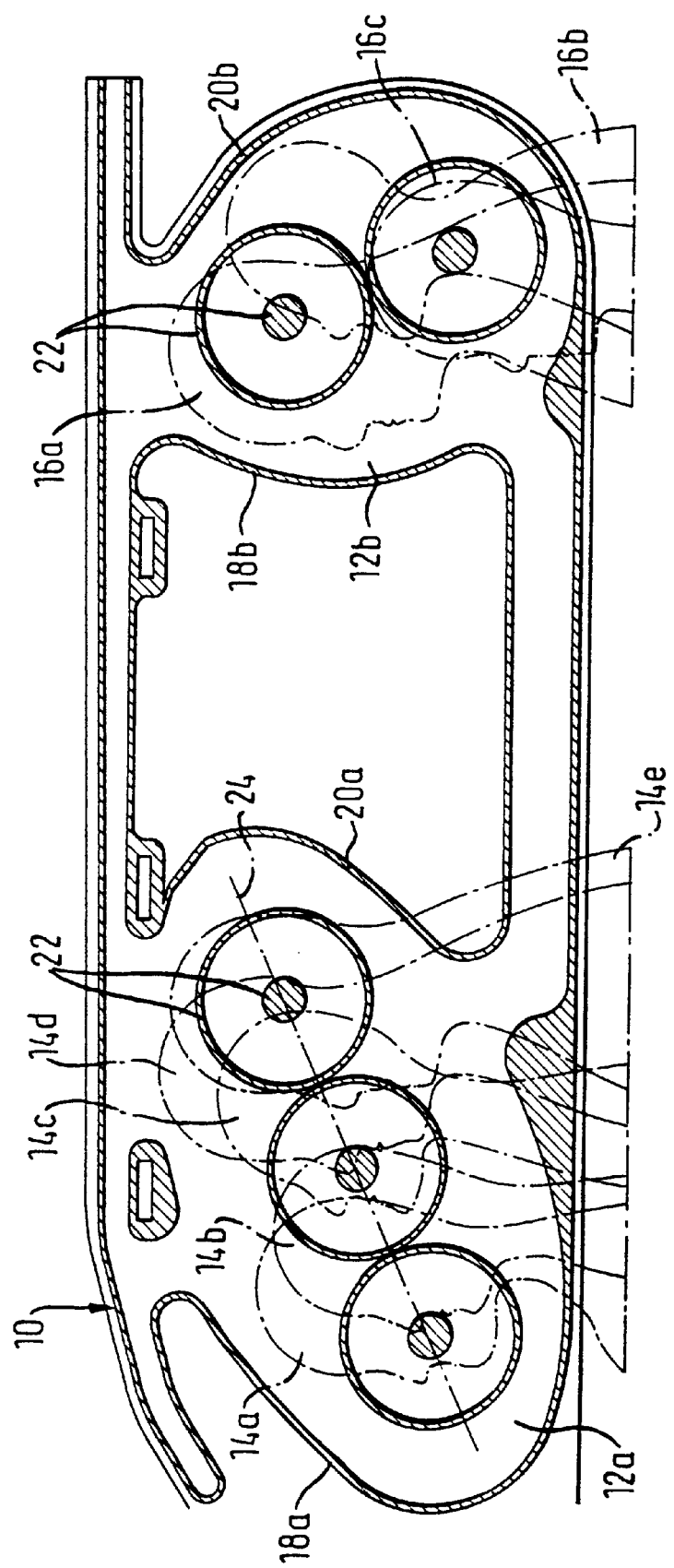
FIG. 1 is a schematic side view of an occupant protective cushion according to the invention.

FIG. 1 shows an inflatable occupant protective cushion 10 with a front chamber 12a and a rear chamber 12b which are connected to each other. In the inflated state, the front chamber 12a protects a front occupant 14, whose possible sitting positions are shown by the contours 14a–14c. In the inflated state, the rear chamber 12b protects a rear occupant 16, whose possible sitting positions are shown by the contours 16a–16c. The front chamber 12a has a front delineation line 18a and a rear delineation line 20a, while the rear chamber 12b has a front delineation line 18b and a rear delineation line 20b. According to a preferred embodiment of the invention, the front delineation lines 18a and 18b have a bulge towards the front while the rear delineation lines 20a and 20b have a bulge towards the rear.

In a preferred embodiment, the chambers 12a and 12b consist of two textile layers opposite from each other which are each joined to each other by means of a plurality of spacers 22. In this manner, it is achieved that the occupant protective cushion does not exceed a certain thickness in the limited space between the occupant and the vehicle wall.

In another preferred embodiment, the spacers 22 are designed in such a way that the textile layers are held at a distance from each other that does not fall considerably below 25 mm, as a result of which a reliable protection is achieved by the occupant protective cushion.

Preferably, the spacers of the front chamber 12a are arranged in a line 24 that rises from the front towards the back, whereby preferably an ascending angle of about 20° to 40° relative to the horizontal is selected. This is advantageous since smaller occupants 14a, 14b usually sit somewhat further forward than larger occupants 14d, 14e.

Advantageously, the line 24 runs approximately through the apex of the bulges of the front and rear delineation lines 18a, 20a of the front chamber 12a, thus achieving a uniform thickness of the front chamber over the entire surface area that is effective for the protection of the occupant.

In the rear chamber 12b, preferably at least two spacers 22 are arranged at different heights between the front and rear delineation lines 18b, 20b of the chambers in order to achieve a uniform thickness of the chambers and thus an optimal protection for larger occupants 16a as well as for smaller occupants 16c.

What is claimed is:

1. An inflatable occupant protective cushion for use along an upper side area in vehicles between an A-column and a C-column, said inflatable occupant protective cushion comprising:

at least two inflatable chambers connected to each other and spaced from each other in a lengthwise direction of the vehicle, said chambers including a front chamber that extends, when inflated, next to typical sitting positions of front occupants and a rear chamber that extends, when inflated, next to typical sitting positions of rear occupants, said front and rear chambers having front and rear delineation lines that are curved in a manner to correspond to a perpendicular projection of said typical sitting positions onto the inflated cushion, each chamber being formed by two textile layers that lie on top of each other and that are directly joined to each other only along a circumferential edge, and a plurality of spacers located inside the circumferential edge and joining said textile layers together, each spacer having first and second end portions spaced apart from each other by a predefined length, said first end portion engaging one of said textile layers, said second end portion engaging another of said textile layers to cause said textile layers to be spaced apart from each other by a minimum distance equal to the spacer length when said chambers are inflated.

2. The protective cushion according to claim 1, wherein said front delineation lines of each chamber have a forwardly extending bulge and said rear delineation lines have a rearwardly extending bulge.

3. The protective cushion according to claim 1, wherein said spacers hold the textile layers at a distance from each other of at least 25 mm.

4. The protective cushion according to claim 2, wherein said spacers in the front chamber are arranged from a front end towards a back end along an ascending line.

5. The protective cushion according to claim 4, wherein said ascending line rises by about 20° to 40° relative to a vehicle horizontal.

6. The protective cushion according to claim 4, wherein said ascending line runs approximately through apex portions of the bulges of the front and rear delineation lines of the front chamber.

7. The protective cushion according to claim 1, wherein at least two spacers are arranged at different heights between the front and rear delineation lines of the rear chamber.

8. An inflatable occupant protective cushion for use along an upper side area in vehicles between an A-column and a C-column, said inflatable occupant protective cushion comprising:

at least two inflatable chambers connected to each other and spaced from each other in a lengthwise direction of the vehicle, said chambers including a front chamber that extends, when inflated, next to typical sitting positions of front occupants and a rear chamber that extends, when inflated, next to typical sitting positions of rear occupants, each chamber being formed by two textile layers that lie on top of each other and that are directly joined to each other only along a circumferential edge, and a plurality of spacers located inside the circumferential edge and joining said textile layers together, each spacer having first and second end portions spaced apart from each other by a predefined length, said first end portion engaging one of said textile layers, said second end portion engaging another of said textile layers to cause said textile layers to be spaced apart from each other by a minimum distance equal to the spacer length when said chambers are inflated.

* * * * *